United States Patent
Foth

(10) Patent No.: US 7,177,933 B2
(45) Date of Patent: Feb. 13, 2007

(54) METHOD FOR LOAD BALANCING OF REQUESTS FOR SERVICE BY DEVICES ON A NETWORK AND A DEVICE AND A NETWORK FOR CARRYING OUT SUCH METHOD

(75) Inventor: Thomas J. Foth, Trumbull, CT (US)

(73) Assignee: Pitney Bowes Inc., Stamford, CT (US)

( * ) Notice: Subject to any disclaimer, the term of this patent is extended or adjusted under 35 U.S.C. 154(b) by 1083 days.

(21) Appl. No.: 09/751,604

(22) Filed: Dec. 29, 2000

(65) Prior Publication Data

US 2002/0087684 A1 Jul. 4, 2002

(51) Int. Cl.
*G06F 15/16* (2006.01)

(52) U.S. Cl. .................... 709/226; 709/238

(58) Field of Classification Search ........... 709/203, 709/205, 217, 223, 229, 238, 204, 226, 245, 709/242; 707/10; 718/105
See application file for complete search history.

(56) References Cited

U.S. PATENT DOCUMENTS

| | | | | |
|---|---|---|---|---|
| 4,122,526 A * | 10/1978 | Dlugos et al. | ............. | 708/206 |
| 5,745,682 A | 4/1998 | Keenan | ............. | 395/200.5 |
| 5,909,682 A | 6/1999 | Cowan et al. | ............. | 707/9 |
| 6,012,088 A | 1/2000 | Li et al. | ............. | 709/219 |
| 6,078,960 A * | 6/2000 | Ballard | ............. | 709/229 |
| 6,104,711 A | 8/2000 | Voit | ............. | 370/352 |
| 6,119,143 A * | 9/2000 | Dias et al. | ............. | 709/201 |
| 6,122,248 A * | 9/2000 | Murakoshi et al. | ............. | 370/216 |
| 6,256,657 B1 * | 7/2001 | Chu | ............. | 718/1 |
| 6,256,675 B1 * | 7/2001 | Rabinovich | ............. | 709/241 |
| 6,304,913 B1 * | 10/2001 | Rune | ............. | 709/241 |
| 6,424,954 B1 * | 7/2002 | Leon | ............. | 705/401 |
| 6,484,143 B1 * | 11/2002 | Swildens et al. | ............. | 705/1 |
| 6,665,702 B1 * | 12/2003 | Zisapel et al. | ............. | 718/105 |

* cited by examiner

*Primary Examiner*—Abdullahi Salad
(74) *Attorney, Agent, or Firm*—Ronald Reichman; Angelo N. Chaclas

(57) ABSTRACT

A method for balancing the load of requests from a number of network devices for service from a selected one of a number of service providers, the devices and the service providers being interconnected by a network, and a network device and a network for carrying out such method. The device stores a location code representative of the devices geographic location and a table relating location codes and network addresses for the service providers. At least the approximate distance from the geographic location of the device and a service provider can be determined from their respective location codes. To send a request the device uses the table to identify the network address of the closest service provider and attempts to log-on to that service provider.

25 Claims, 3 Drawing Sheets

METHOD FOR LOAD BALANCING OF REQUESTS FOR SERVICE BY DEVICES ON A NETWORK AND A DEVICE AND A NETWORK FOR CARRYING OUT SUCH METHOD

BACKGROUND OF THE INVENTION

The subject invention relates to communication on a network among a plurality of devices requesting service and a plurality of service providers. More particularly, it relates to balancing the load of service requests among the service providers.

It is common for devices on a network to request required services from a service provider on the network. Such services may be any type of data service that is more readily carried out by a remote service provider, such as updating of databases, downloading software, remote diagnostics, or computationally intensive operations.

In networks where there is a heavy volume of service requests from a large number of devices, having a number of service providers capable of providing the requested services on the network generally will provide better response, increase reliability, and be more economical than providing a single service provider capable of handling peak loads. Such networks will be more effective if some mechanism for "load balancing" is provided. By "load balancing" herein is meant distributing requests for service substantially uniformly over the service providers on the network. Heretofore, load balancing typically has been carried out by directing all requests to a central site, which would direct the request to one of the service providers.

While effective this method has certain disadvantages. The increase in network traffic to route all requests through a central site may cause a corresponding increase in response time. It is known for some load balancers to redirect a device that uses that address until the connection completes. In this way, the load balancer is only affected by the traffic from devices at the start of connection. Often there is more than one load balancer in the network so that if the primary fails, the backup is discovered (by way of Domain Name Services alternates) and used. Also, such load balancing mechanisms will route requests based on the network address of the requesting device, which may not reflect the actual geographic location of the requesting device and may result in requests being serviced by a geographically remote service provider. (It is believed that the optimum service provider generally will be the geographically closest available service provider.) For these and other reasons, some networks do not provide load balancing.

It is noted that there are load balancers that operate at the ends of a network, but to be effective, they need to operate over a majority of network endpoints. For small to medium applications, such as Internet appliances that only very occasionally connect, this means this type of load balancing is not cost effective.

Thus, it is an object of the subject invention to provide a more effective and simpler method for load balancing on a network, and a device capable of carrying out that method, and a network incorporating such devices.

BRIEF SUMMARY OF THE INVENTION

The above object is achieved and the disadvantages of the prior art are overcome in accordance with the subject invention by a method for balancing the load of requests from a plurality of network devices for service from a selected one of a plurality of service providers; and a network connecting the devices and service providers, and a network device programmed to carry out the method. Devices and service providers communicate over the net in any convenient manner; which can include any of numerous known network architectures and compatible protocols. In accordance with the subject invention, each of the devices stores a location code indicative of geographic locations of the devices and stores a table relating geographic location codes and network addresses for the service providers. Each of the devices is programmed so that a requesting device initiates a request by: 1) retrieving the location code for the requesting device; 2) accessing the table to retrieve a service provider address associated with a service provider location code closest to the retrieved location code; and 3) addressing the initiated request with the retrieved service provider address.

In accordance with a broad aspect of the subject invention, the network device can carry out any convenient function and the service providers can provide any convenient function. The network device may be any device which may know as a matter of its operation, its geographic address.

In accordance with another aspect of the subject invention, the network device is a mailing device.

In accordance with another aspect of the subject invention, at least an approximate distance between two geographic locations can be calculated as a function of location codes corresponding to the two locations.

In accordance with still another aspect of the subject invention, devices access the table to retrieve another service provider address associated with a service provider location code next closest to the retrieved location code if they cannot log on to the service provider.

Other objects and advantages of the subject invention will be apparent to those skilled in the art from consideration of the detailed description set forth below and the attached drawings.

BRIEF DESCRIPTION OF THE DRAWINGS

The above and other objects and advantages of the present invention will be apparent upon consideration of the following detailed description, taken in conjunction with accompanying drawings, in which like reference characters refer to like parts throughout, and in which.

DETAILED DESCRIPTION OF THE PREFERRED EMBODIMENTS OF THE INVENTION

Figure 1:
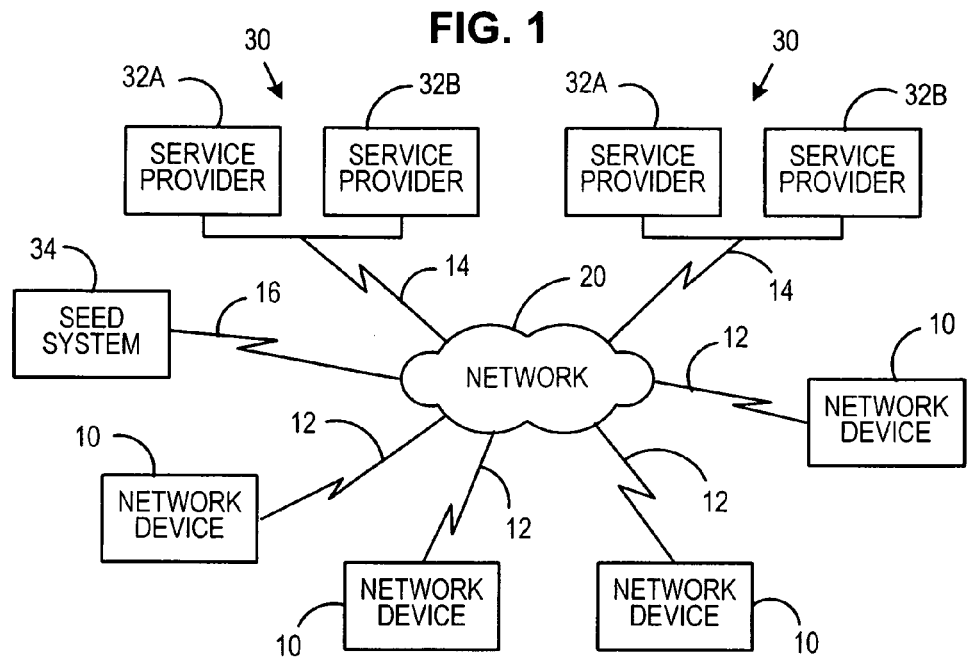
FIG. 1 shows a network in accordance with the subject invention.

FIG. 1 shows a plurality of network devices 10 connected by data links 12 to a communications network and a plurality of data centers 30 connected to network 20 by communications links 14. Data centers 30 include service providers 32A and 32B (hereinafter sometimes referred to generally as service providers 32) which provide services to network devices 10. In general, devices 10 can carry out any convenient function, and service providers 32 can provide any convenient service, such as updating of data bases, downloading of software, off-line computationally intensive operations and diagnostics. (It should be noted that, while various network devices 10 can have different functions and various service providers 32 can provide different services, their operations and functions are substantially identical in balancing the load created by requests for service in accordance with the subject invention.) In a preferred embodiment of the subject invention, network devices 10 include mailing devices, such as postage meters and rating scales, which determine postage amounts or shipping charges for mail pieces or packages to be shipped. Comprising of such mailing devices in a system in accordance with the subject invention is believed to be advantageous in that it is inherently beneficial to provide communications with a service provider; postage meters can more easily keep track of funds equivalents and rates used by scales can be easily updated. Further, mailing devices inherently must store the zip code of their geographical location. (Scales compute rates as a function of the origin zip code and the input destination zip code and, so, are initially programmed with the zip code of their geographic location. Postage meters, on the other hand, are required to be used at a particular location and to store the zip code of that location. The importance of the zip code of the location at which the device is used will be explained more fully below.)

The preferred embodiment of the subject invention also includes other network devices, such as consumer appliances (refrigerators and the like) that communicate over a network, such as the Internet. Such consumer appliances may be candidate devices for this system inasmuch as they can be made aware of their location to fulfill warranty requirements. Also, cellular telephones with Internet interfaces which have a mandate to provide geographic location by the Federal Communications Commission, as well as devices on wireless networks, such as Mobitex (used by, for example, the Palm™ VII), which provide the address of the base station servicing the wireless device, are candidates for the present invention.

FIG. 1 also shows seed system 34, connected to network 20 by communications link 16. System 34 will be more fully described below.

It should be noted that the network architecture and protocols used play no part in the subject invention, and any convenient architecture and compatible protocol can be used.

Figure 2:
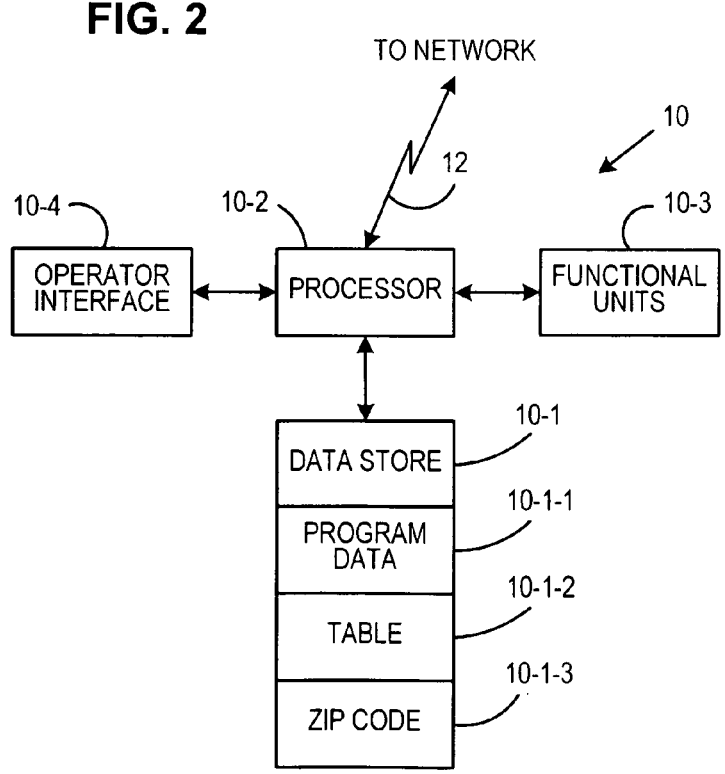
FIG. 2 shows a network device that communicates with service providers over the network of FIG. 1.

FIG. 2 shows a schematic block diagram of a generalized network device 10. Device 10 includes data store 10-1, processor 10-2, functional units 10-3 and operator interface 10-4. Data store 10-1 includes data stores for: program data 10-1-1, for controlling the operation of device 10; a table 10-1-2 relating location codes representative of the geographic locations, and corresponding network addresses, of service providers; and a location code 10-1-3 for the location of device 10. Preferably location codes are structured so that codes that are "close" represent locations which are geographically close; so that at least an approximate geographic distance between two locations can be calculated from their location codes. In a preferred embodiment of the subject invention, the location codes are zip codes. (By zip code herein is meant both the "Zip Code" used by the United States Postal Service and similar codes used by other countries.) Operator interface 10-4 provides for communication with a human operator.

Processor 10-2 is responsive to operator inputs through interface 10-4 and relevant portions of program data 10-1-1 to control functional units 10-3 to carry out the functions of device 10. A more detailed description of such functions is not believed necessary to an understanding of the subject invention. Processor 10-2 is also responsive to operator inputs through interface 10-4 and relevant portions of program data 10-1-1 to request service from a selected one of said service providers 32. A more detailed description of such services also is not believed necessary to an understanding of the subject invention.

Figure 3A:
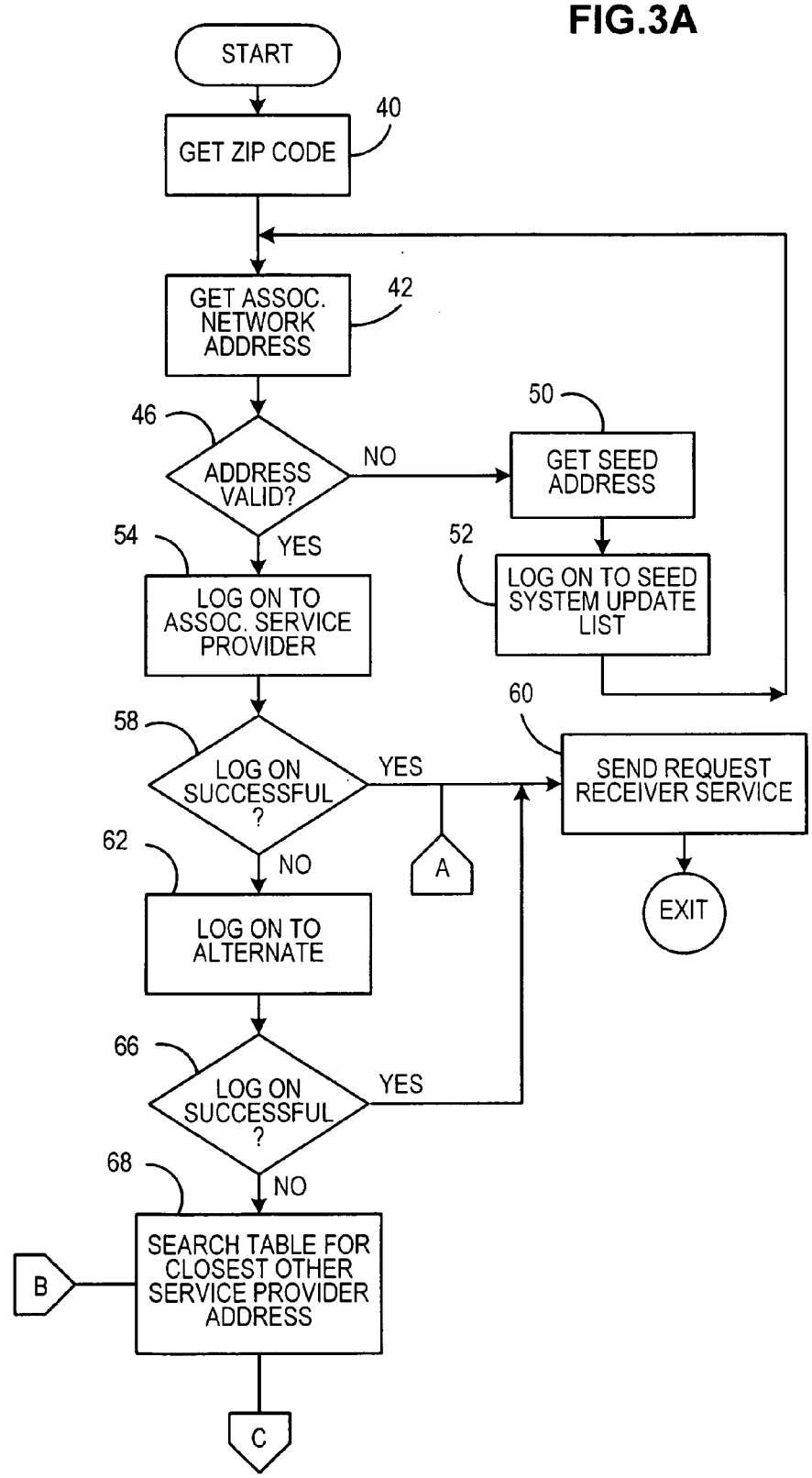
FIGS. 3A and 3B show a flow diagram of the operation of the device of FIG. 2 in establishing communications over the network of FIG. 1.
Figure 3B:
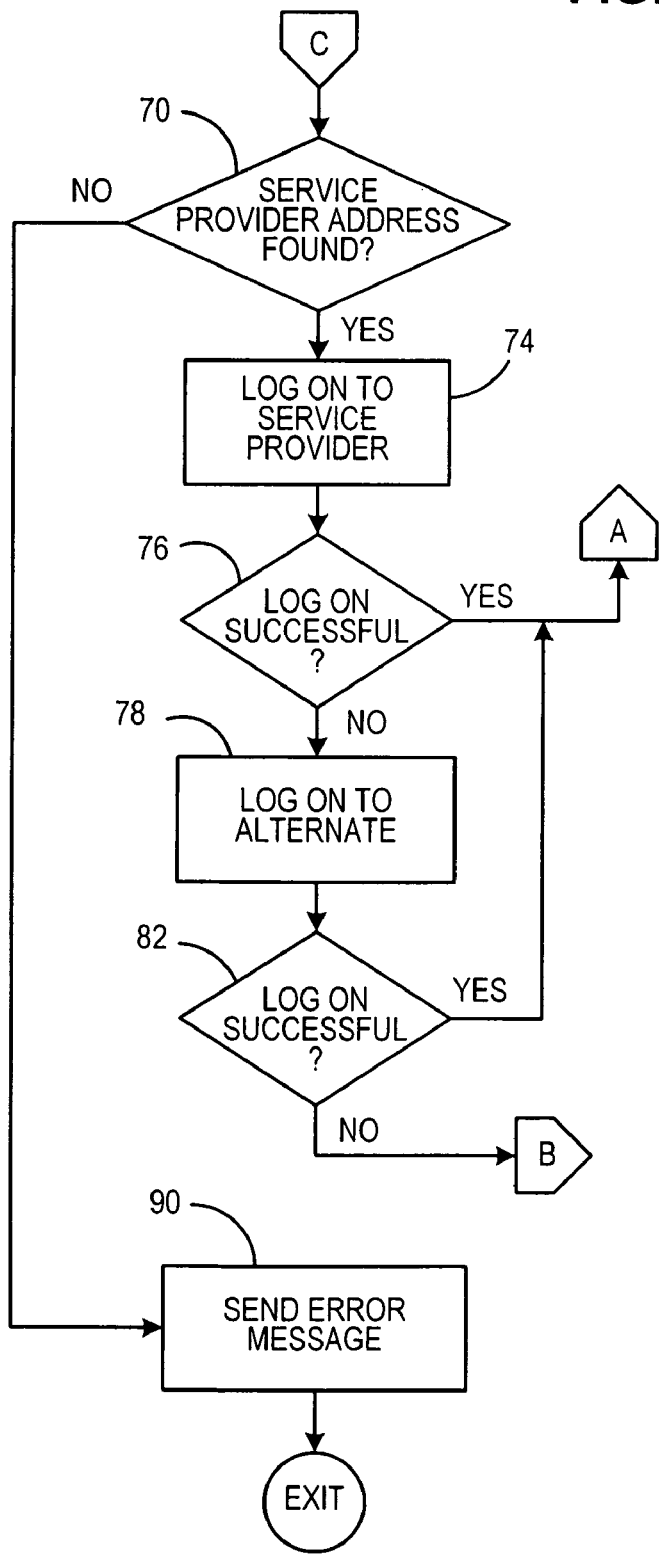

FIGS. 3A and 3B show a flow diagram of the operation of device 10 in accordance with relevant portions of the program code to request service from a service provider. At 40, device 10 retrieves the previously stored location code, which in a preferred embodiment will be a zip code but which can be any convenient code. As noted above, where device 10 is a postage meter, postal regulations require that it store the zip code of the post office at which the metered mail must be deposited (which is presumed by the system to be geographically close to the meter). Where device 10 is a rating scale, the scale requires a local zip as well as a destination zip to compute costs for distance ("zone") sensitive rates. Thus, the zip code for the geographic location of such devices will be readily available. Other methods for establishing the location code for device 10 are also within the contemplation of the subject invention. Such methods can include, without limitation, input by the device operator, input during installation or set-up, down loading through network 20 in response to a communication, either on-line or off-line. (For example, an off-line communication can be receipt of a warranty card, which would include the location of device 10 so that service can be efficiently dispatched.) Where device 10 is a mobile device, it can include a Geographic Positioning System (GPS) to monitor its location. As previously stated, where device 10 is a mobile device, the base station servicing the device may furnish its fixed geographic location.

At 42, device 10 accesses table 10-1-2. Each record in table 10-1-2 relates the location code of a service provider and its network address. Preferably the location codes are so designed that at least an approximate distance between device 10 and one of service providers 32 can be analytically computed from the respective location codes. An example of such conversion, referred to as "zip-to-zone" conversion, is described in U.S. Pat. No. 4,122,526, titled CALCULATING AND POSTAL ZIP CODE-TO-POSTAL ZONE CONVERTING APPARATUS. Where location codes are fully analytical, so that at least sometimes distances cannot be computed, look-up tables can be provided. Device 10 then determines the network address of the closest service provider.

At 46, device 10 then determines if the address is valid. For example, an invalid address can be indicated by receipt of a "fatal address error" message.

If the address is invalid, at 50, device 10 obtains an address for seed system 34, which communicates through network 20 over communications link 16, and at 52 logs on to system 34 to download a current table. Seed system 34 can be a dedicated system or can be a designated one of service providers 32. Device 10 would be programmed at the factory with the seed address. If the seed address changed, device 10 can obtain the new seed system address in any convenient manner such as, for example, having an operator place an off-line service call to obtain the address and enter it through interface 10-4. Device 10 then returns to 42 to obtain a service provider address from the current table.

If the address is valid, at 54 device 10 attempts to log-on to the selected one of service providers 32, and, if the log-on is determined successful at 58, at 60 sends a service request to that provider and exits.

In a preferred embodiment of the subject invention, two of service providers 32 may share the network address of a data center 30. Devices 10 will be assigned to one of service providers 32 at center 30 as primary, and to the other as alternate, in any convenient manner. For example, devices 10 with even serial numbers can be assigned to service provider 32A as primary while devices 10 with odd numbers are assigned to service provider 32B.

Thus, if the log-on attempt is determined unsuccessful at 58, at 62 device 10 attempts to log-on to the alternate one of service providers 32, and, if the log-on is determined successful at 66, at 60 sends a service request to the alternate provider and exits.

If the log-on attempt is determined unsuccessful at 66, at 68 device 10 returns to the table to search for the next closest one of service providers 32. If at 70 device 10 determines that another service provider has been found then at 74 device 10 attempts to log-on to its primary one of service providers 32, and, if the log-on is determined successful at 76, at 60 sends a service request to the alternate provider and exits. If the log-on attempt is determined unsuccessful at 76, at 78 device 10 attempts to log-on to the alternate one of service providers 32 at the closest (and now current) network address, and, if the log-on is determined successful at 82, at 60 sends a service request to the alternate provider and exits. If device 10 is unsuccessful in logging-on, then at 82, it returns to 68 to search the table again. When at 70 no service provider address can be found, device 10 sends an error message and exits, or exits to some other convenient error routine.

Thus, it can be seen that the subject invention will efficiently balance the load of service requests on the network by assigning each request to the available service which is geographically closest, without requiring a central cite or other network hardware or software to assign requests. It is believed that the subject invention will thus, substantially reduce network complexity and traffic flow relating to load balancing. This scheme reduces the need for central load balancing equipment to the point where a simple system distributes new address tables only to those devices that do not have accurate tables. The devices are systematically load balanced across service providers geographically closest and further statistically load balanced to specific systems at those geographically close service provider sites. The potential for load balancer failure is eliminated inasmuch as no load balancers exist in the described system. Initial connection times are enhanced because there is no need for initial redirection. Finally, this system is compatible with numbered addressing systems such as Internet Protocol (IP) addresses directly and does not rely on the complexity of resolving Universal Resource Locators (URLs) or other such names. This simplifies device design and construction.

The embodiments described above and illustrated in the attached drawings have been given by way of example and illustration only. From the teachings of the present application those skilled in the art will readily recognize numerous other embodiments in accordance with the subject invention. Accordingly, limitations on the subject invention are to be found only in the claims set forth below.

What is claimed is:

1. A method for balancing the load of requests from a plurality of network devices for service from a selected one of a plurality of service providers, said devices and said service providers being interconnected by a network, said method comprising the steps of:
   a) in each of said devices, storing a location code indicative of geographic locations of said devices;
   b) in each of said devices, storing a table relating geographic location codes and network addresses for said service providers; and
   c) said devices being programmed so that a requesting device initiates a request by:
      c1) retrieving said location code for said requesting device;
      c2) accessing said table to retrieve a service provider address associated with a service provider location code geographically closest to said retrieved location code; so that utilization of the service providers is systematically load balanced with respect to the geographical location of the client
      c3) addressing said initiated request with said retrieved service provider address; and
   d) accessing by said devices a seed system to download an updated table if said devices cannot access the service provider retrieved from said table.

2. The method of claim 1 wherein at least one of said network devices is a mailing device.

3. The method of claim 1 wherein at least an approximate distance between two geographic locations can be calculated as a function of location codes corresponding to said two locations.

4. The method of claim 3 wherein said location codes are zip codes used by a postal service.

5. The method of claim 1 wherein a group of said service providers share a common location code and selected ones of those of said devices which are closest to said group address initiated a request to a primary service provider in said group; said method further comprising the step of: said selected devices addressing said initiated request to an alternate service provider in said group if they cannot log on to said primary service provider.

6. The method of claim 5 further comprising the step of: said selected devices accessing said table to retrieve another service provider address associated with a service provider location code next closest to said retrieved location code if they cannot log on to said primary or said alternate service provider.

7. The method of claim 1 further comprising the step of: said devices accessing said table to retrieve another service provider address associated with a service provider location code next closest to said retrieved location code if they cannot log on to said service provider.

8. The method of claim 1, wherein the location code is a zip code.

9. A network device, said device receiving service from a selected one of a plurality of service providers when said device and said service providers are interconnected by a network, said device comprising:
   a) a first data store storing a location code indicative of said device's geographic location;
   b) a second data store storing a table relating geographic location codes and network addresses for said service providers; and
   c) said device being programmed to initiate a request by:
      c1) retrieving said location code for said device;
      c2) accessing said table to retrieve a service provider address associated with a service provider location code geographically closest to said retrieved location code; so that utilization of the service providers is systematically load balanced with respect to the geographic location of the client:
      c3) addressing said initiated request with said retrieved service provider address; and d) accessing by said devices a seed system to download an updated table if said devices cannot access the service provider retrieved from said table.

10. The device of claim 9 wherein said network device is a mailing device.

11. The device of claim 9 wherein at least an approximate distance between two geographic locations can be calculated as a function of location codes corresponding to said two locations.

12. The device of claim 11 wherein said location codes are zip codes used by a postal service.

13. The device of claim 9 wherein a group of said service providers share a common location code, said device addressing said initiated request to a primary service provider in said group, and said device being further programmed to address said initiated request to an alternate service provider in said group if said device cannot log on to said primary service provider.

14. The device of claim 13 wherein said device is further programmed to access said table to retrieve another service provider address associated with another service provider location code next closest to said retrieved location code if said device cannot log on to said primary or said alternate service provider.

15. The device of claim 9 wherein said device is further programmed to access said table to retrieve another service provider address associated with another service provider location code next closest to said retrieved location code if said device cannot log on to said service provider.

16. The method of claim 9, wherein the location code is a zip code.

17. A network comprising a plurality of network devices and a plurality of service providers, said devices receiving service from selected ones of said service providers when said devices and said service providers are interconnected by said network, said devices each comprising:
   a) a first data store storing a location code indicative of that device's geographic location;
   b) a second data store storing a table relating geographic location codes and network addresses for said service providers; and
   c) each of said devices being programmed to initiate a request by:
      c1) retrieving said location code for said device
      c2) accessing said table to retrieve a service provider address associated with a service provider location code geographically closest to said retrieved location code; so that utilization of the service providers is systematically load balanced with respect to the geographic location of the client;
      c3) addressing said initiated request with said retrieved service provider address; and
   d) accessing by said devices a seed system to download an updated table if said devices cannot access the service provider retrieved from said table.

18. The network of claim 17 wherein at least one of said devices is a mailing device.

19. The network of claim 17 wherein at least an approximate distance between two geographic locations can be calculated as a function of location codes corresponding to said two locations.

20. The network of claim 19 wherein said location codes are zip codes used by a postal service.

21. The network of claim 17 wherein a group of said service providers share a common location code, selected ones of those of said devices which are closest to said group addressing said initiated request to a primary service provider in said group; said selected devices being further programmed to address said initiated request to an alternate service provider in said group if they cannot log on to said primary service provider.

22. The network of claim 21 wherein said selected devices are further programmed to access said table to retrieve another service provider address associated with another service provider location code next closest to said retrieved location code if they cannot log on to said primary or said alternate service provider.

23. The network of claim 17 wherein said devices are further programmed to access said table to retrieve another service provider address associated with another service provider location code next closest to said retrieved location code if they cannot log on to said service provider.

24. The network of claim 17 wherein said devices are further programmed to access a seed system to download an updated table if said table becomes invalid.

25. The method of claim 17, wherein the location code is a zip code.

* * * * *